Figure 1:
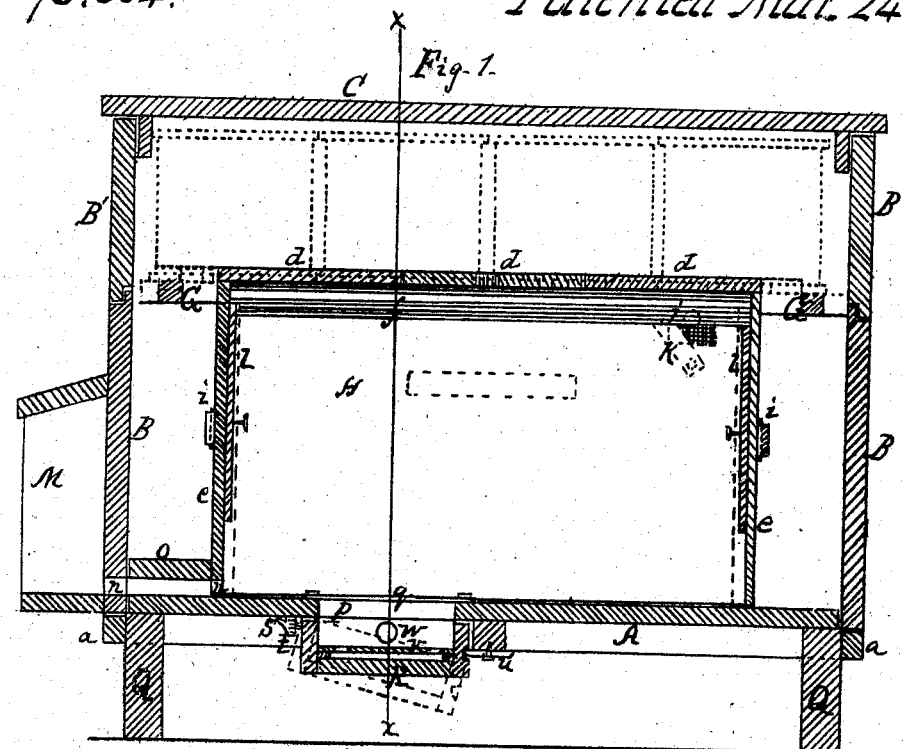
Figure 2:
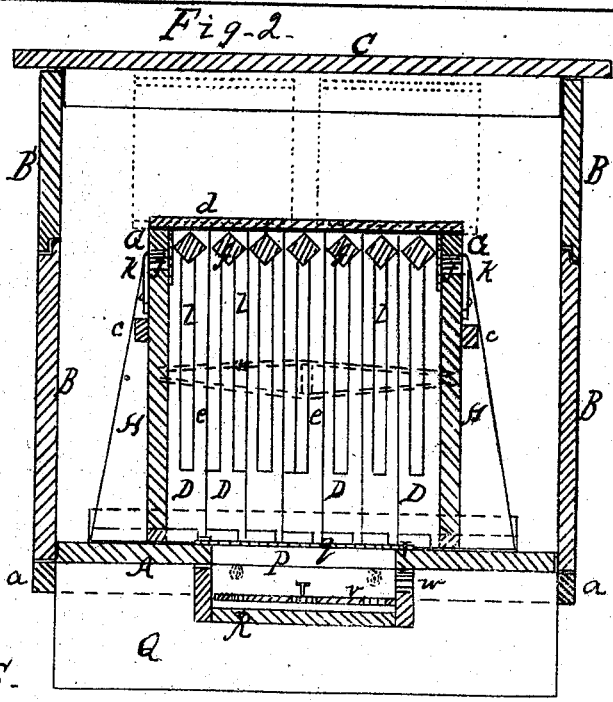

M. S. Snow,
Bee-Hive.

No. 75,804. Patented Mar. 24, 1868.

Witnesses.
G. Burkhards
A. Becker

Inventor.
M. S. Snow
by Forbush & Hoyatt, att'ys

United States Patent Office.

M. S. SNOW, OF FORESTVILLE, NEW YORK.

Letters Patent No. 75,804, dated March 24, 1868.

IMPROVEMENT IN BEE-HIVES.

*The Schedule referred to in these Letters Patent and making part of the same.*

TO ALL WHOM IT MAY CONCERN:

Be it known that I, M. S. SNOW, of Forestville, in the county of Chautauqua, and State of New York, have invented certain new and useful Improvements in Bee-Hives; and I do hereby declare that the following is a full and exact description thereof, reference being had to the accompanying drawings, making part of this specification, in which—

Figure I is a longitudinal vertical section.

Figure II is a cross vertical section of the same, in plane of line $x\ x$, Fig. I.

Like letters of reference designate corresponding parts in both figures.

The invention consists in the construction and arrangement of a miller-box underneath the bottom board of bee-hives, and in the peculiar construction of the bottom board, so arranged with the outer case of the hive as to perfectly exclude water and moisture from the latter.

As illustrated in the drawings, A is the bottom board of the bee-hive, supported in any suitable manner; B B', the outer case, made in two portions, both removable, the upper portion, B', being provided with a suitable top or cover, C. The inner hive is composed of a series of comb-frames, D D, each of which consists of an upright, $e$, at each end, that are connected at their top by a longitudinal square piece, $f$, arranged as shown in Fig. II, so that its diagonals are horizontal and vertical, leaving a space between each of said top pieces for the passage of the bees into the auxiliary or surplus-honey boxes, which are arranged above in the usual manner. A portion of each of the standards $e$, at the bottom, is cut away, to form an entrance for the bees. The comb-frames are arranged within a frame, G, at the top of the hive, to which are fastened the side boards H H, for closing the sides. The said frames are further secured by a wire, $i$, at each end, as shown in dotted lines, Fig. II. In each side, near the top of the hive, are formed one or more ventilating-holes, $j$, protected on the inner side by wire gauze, and closed, when required, on the outer, by caps $k$. There is a bead, $l$, formed centrally on the inner side of the standards $e$ of the comb-frame, which, with the projecting angle or edge of the longitudinal pieces $f$, serves as a guide for the bees in attaching the comb, thereby rendering it straight. A landing or porch, M, is provided at one end of the case A, on or in which the bees alight. The lower end of the case is recessed, to form an aperture, $n$, for the entrance of the bees. The space between the case and inner hive at this point is covered by a bridge, O, to prevent the escape of the bees into the space surrounding the inner hive, and to prevent the straw, shavings, or other packing-material that is designed to be filled in around the said inner hive in winter, from closing the passage. Q Q are two supports at the ends of the bottom board, to which it is secured. P represents an aperture in the bottom board, covered by wire cloth, $q$. Underneath this opening I arrange what I term a miller-box, R, hinged at one side, or supported by projecting pins $s$, fitting in eyes $t$, secured to the bottom board. The other side is fastened up in place by a button, $u$, or equivalent device. In the bottom of this box I arrange a removable perforated floor or diaphragm, $v$, leaving a small space between the same and the bottom of the box. Millers are allowed access into this box through an opening, $w$, for the purpose. The object of this feature of my invention is to provide an attractive retreat for millers, so as to prevent their endeavoring to gain access to the hive through the bee-entrance. They are attracted to this box by the fragrance of the particles of comb that fall through the wire cloth on the perforated diaphragm. Entering through the opening $w$ into the box, the queen miller deposits her eggs in this retreat. The larvæ, as soon as hatched, crawl through the perforations of the diaphragm into the space underneath, and begin forming their cocoons. By removing this diaphragm from time to time, these larvæ, moths, and partially-formed cocoons can be readily destroyed. The wire cloth prevents the entrance of millers and other insects into the hive, while it permits the fine particles of comb to sift through into the box beneath. It also permits the free entrance of air for ventilation.

In hot weather the box may be lowered at one side, being retained in the position shown by dotted lines by the pins $s$, fitting in the eyes $t$, thereby permitting a full supply of air, which keeps the hive cool, and causes the bees to remain in the hive, which in extremely hot weather they are not inclined to do. In winter, if desired, the hive can be entirely closed, except the opening in the miller-box, which will supply the necessary air, and prevent suffocation.

The bottom board A is provided with a depressed outer ledge, *a*, on which rests the bottom edge of the case B, which shuts over the upper surface of the board, as clearly represented. This construction and arrangement of the bottom board with the case, leaving the inner surface of the said board elevated above the joint at the ledge, effectually prevents all entrance of water or moisture, which other and ordinary modes of construction permit to a limited extent.

The importance of keeping the inner side of the hive perfectly dry, to prevent mould and other deleterious consequences, is apparent.

The bottom board or stand it forms, with its end supports Q Q, is not made permanently fixed, but is designed to be removable from one colony to another, if required.

The surplus-honey boxes, represented by red lines, are designed to be arranged in two rows, with a narrow strip between, to prevent the escape of the bees. In winter these boxes are removed, and boards *d d* placed on top of the inner hive, and the space above and around the hive, between it and the case, filled with straw, shavings, or other packing-material, to protect the hive from the extreme cold.

The top, or either or both portions, B B', of the casing, can be removed, if required. The inner hive can be removed by means of the handles *c c*, fastened to each side.

What I claim as my invention, and desire to secure by Letters Patent, is—

The miller-box R, provided with perforated diaphragm *v* and aperture *w*, arranged with the opening P and wire cloth *q*, substantially in the manner and for the purpose set forth.

<div align="right">M. S. SNOW.</div>

Witnesses:
   A. RICHARDS,
   DAVID WHITE.